United States Patent
Gaunt et al.

[15] 3,645,825
[45] Feb. 29, 1972

[54] APPARATUS FOR SEALING THIN WALLED CONTAINERS

[72] Inventors: Thomas Norman Gaunt, Leeds; Edward Dodsworth, Pudsey, both of England

[73] Assignee: Plastona (John Waddington) Limited, Leeds, England

[22] Filed: May 19, 1969

[21] Appl. No.: 825,756

[30] Foreign Application Priority Data

| May 21, 1968 | Great Britain | 24,083/68 |
| May 21, 1968 | Great Britain | 24,084/68 |
| Feb. 1, 1969 | Great Britain | 5,543/68 |

[52] U.S. Cl. ............................156/361, 53/39, 53/42, 156/69, 156/552
[51] Int. Cl. ........................B29c 27/02, B65b 7/00
[58] Field of Search ............156/69, 552, 489, 361; 53/38, 53/39, 40, 42, 285, 286, 287

[56] References Cited

UNITED STATES PATENTS

| 2,375,451 | 5/1945 | Waters | 156/361 X |
| 2,653,727 | 9/1953 | Wagner et al. | 156/489 X |
| 2,776,509 | 1/1957 | Kienel | 156/358 |
| 3,193,978 | 7/1965 | Bader | 53/39 X |
| 3,210,910 | 10/1965 | Seefluth | 53/39 X |

FOREIGN PATENTS OR APPLICATIONS

| 1,335,117 | 7/1963 | France | 156/69 |
| 1,008,075 | 10/1965 | Great Britain | 156/69 |

Primary Examiner—Samuel W. Engle
Assistant Examiner—G. E. Montone
Attorney—Abraham A. Saffitz

[57] ABSTRACT

Apparatus for sealing molded thin wall thermoplastic containers with lidding from a roll of lidding material wherein the containers move on platens in queues in groups of four containers on each platen past a sealing head and the lidding material is adhered about the top peripheral flange of the container, while the containers almost touch, the movement of the queue unrolling the roll of lidding material, and thereafter severing the lidding material between adjacent containers in the queue. The lids may be printed.

7 Claims, 4 Drawing Figures

PATENTED FEB 29 1972

INVENTOR
THOMAS NORMAN GAUNT
and EDWARD DODSWORTH
BY Abraham A. Saffitz
ATTORNEY

APPARATUS FOR SEALING THIN WALLED CONTAINERS

The present invention relates to a method of, and apparatus for, the sealing of thin walled containers with a lidding material which is sealed to a peripheral flange of each container. The containers are filled before they are so sealed but the type of filling is of no importance to this invention. However, it is probably worth mentioning that because the containers are sealed, they find wide application for containing foodstuffs.

According to the present invention there is provided a method of sealing thin walled containers each having a top peripheral flange, comprising moving a queue of containers and a sealing head relative to one another in the direction of said queue, sealing lidding material from a roll of such material to the flanges of such containers and severing the lidding material between adjacent containers in the queue.

Preferably in the method, the queue of containers moves past the sealing head and roll of lidding material and it is a further preferred feature of the method that the lidding material should be unrolled by virtue of being sealed to containers in the moving queue. The sealing of the lidding material may be carried out by a heat sealing process in which die means seals the lidding material and the container peripheral flange together, and of course if this method is used then the lidding material and flange must be of compatible heat-sealable material. Examples of suitable materials which exhibit this heat-sealability characteristic are polystyrene, polyvinyl chloride, polythene and polypropylene, and the lidding material and containers may be made entirely from such materials or may be of a base material suitably coated with such materials.

As an alternative to the heat sealing using die means as mentioned above, the lidding material and flanges may be stuck together by adhesive. If this method is used, then of course the range of possible materials for the container and lidding material is increased. In a preferred method in this case, the lidding material is pretreated with a heat-activated adhesive which is activated before the lidding material is brought into contact with the container flanges and the adhesive is such that it remains activated for a sufficient length of time (at least several seconds) to enable the tacky surface to be brought into contact with the flanges of the containers in the queue. The sealing means in this case could simply be a roller which is made of, or has an outer coating of, resilient material such as rubber or sponge rubber, so that the lidding material and flange are pressed resiliently together. The adhesive may be activated by any suitable heating means such as infra-red heaters or hot air. As an alternative, the adhesive coating may be applied to the flanges of the containers instead of, or in addition to, the lidding material, and suitably activated before application of the lidding material.

In the case where an adhesive is used, as aforesaid, the queue of containers can move in a continuous manner, but in the case where die means is used, the queue must move intermittently to enable the die means to be operated during the dwell periods. In more cases than not, the lidding material will contain a printed, repeating pattern so that such pattern will appear on the sealed container, and in such cases, the printed matter must be in accurate register with the container to which the particular part of the lidding material is to be sealed. As printing techniques cannot guarantee that the repeating patterns will be accurately pitched on the lidding material and because many lidding materials may stretch during the sealing process, it is not advisable to use printed lidding material when the queue of containers is moving continuously, but only when there is an intermittent feed of such containers so that a compensating means can be used to bring the printed matter and container into exact register before they are sealed together. The method of using a compensating means is more appropriate when the heat sealing step using the die means is employed, as there is no danger of the lidding material and container adhering together before compensation, which requires a relative displacement of the lidding material and container in the direction of the queue of containers, takes place.

The queue of containers is preferably two or more deep and the lidding material has a width corresponding exactly to the width of the queue of containers so that there is little or no wastage of lidding material. In the queue of containers, such containers are preferably positioned so that the flanges of adjacent containers are as close together as possible.

Also according to the invention we provide apparatus for sealing thin walled containers each having a top peripheral flange, said apparatus comprising, a plurality of side-by-side platens adapted to support a queue of said containers, a sealing head, support means for a roll of lidding material, the apparatus being adapted to operate such that the head and a queue of containers carried by the platens are moved relative to one another in the direction of such queue, and lidding material from a roll of such material on the support means is sealed to the flanges of the queue of containers by the sealing head, and including severing means for severing the lidding material extending between adjacent containers.

Preferably, the sealing head and support means for the lidding material are stationary and there is drive means for moving the platens past the sealing head, the arrangement being that the lidding material is unrolled by the movement of the platens after it has been sealed to the leading containers in such platen.

The drive means is preferably an intermittent drive means providing dwell times between movements of the platens, and the sensing head has reciprocable die means for heat sealing the lidding material to the containers during such dwell times.

The platens are preferably each adapted to carry four containers in a square array, and are preferably accurately machined to within one thousandth of an inch so that the flanges of adjacent containers therein and in adjacent platens will be almost touching, ensuring that there is a minimum wastage of the lidding material.

The apparatus preferably also includes compensating means for use when the apparatus is sealing the containers with printed lidding material, to ensure that the printed matter is brought into exact register with the platen under the die means before sealing of the containers in such platen.

The compensating means preferably includes a photoelectric sensing means adapted to sense the position of the lidding material, and an adjusting means under the control of the sensing means to adjust the position of the lidding material in relation to the platen under the die means. The adjusting means may comprise a friction wheel engaging a platen downstream of the sealing head but upstream of the severing means and a brake motor which is drivingly connected to the friction wheel and is under the control of the photoelectric sensing means.

As an alternative to heat sealing the lidding material to the containers with a die means, it may be possible to simply stick the lidding material to the container flanges. In such a case the sealing head might be simply a means, such as a roller for pressing the lidding material and flanges together. In the case of a roller, it may be entirely of a compressible substance or it may have a coating of such substance. If the adhesive is heat activated, the apparatus will incorporate heating means for activating the adhesive on the lidding material, the flanges or both, before they are sealed together. Such an adhesive would preferably be of a type which remains activated for a substantial length of time (at least 2 seconds).

An embodiment of this invention will now be described, by way of example, with reference to the accompanying drawings, wherein.

Figure 3:
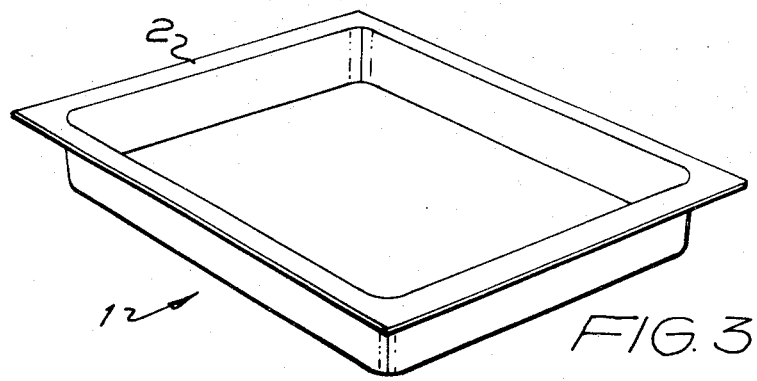
FIG. 3 is a perspective view of a container of the type which the platens are adapted to carry.
Figure 4:
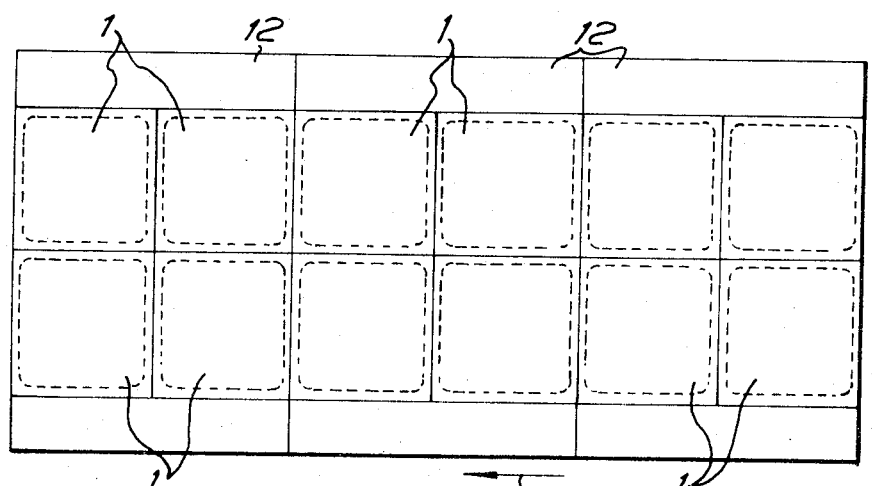
FIG. 4 is a plan view of several platens and sealed containers therein in the positions which they take up in the apparatus, and showing several platens with the lidding material severed, and one with the sealed containers still joined together by the lidding material.

Considering firstly FIG. 3, the container 1 shown therein is of shallow square box shape, and is of thin walled, moulded thermoplastics material such as polystyrene. The container is open topped and has a top peripheral flange 2 thereto, to which the lidding material is sealed to seal the container. The apparatus about to be described is adapted to handle the shape of container shown in FIG. 3, but it will readily be appreciated that it is a simple matter to alter the apparatus to containers of other shapes and which also have a peripheral flange to which lidding material can be sealed.

Figure 1:
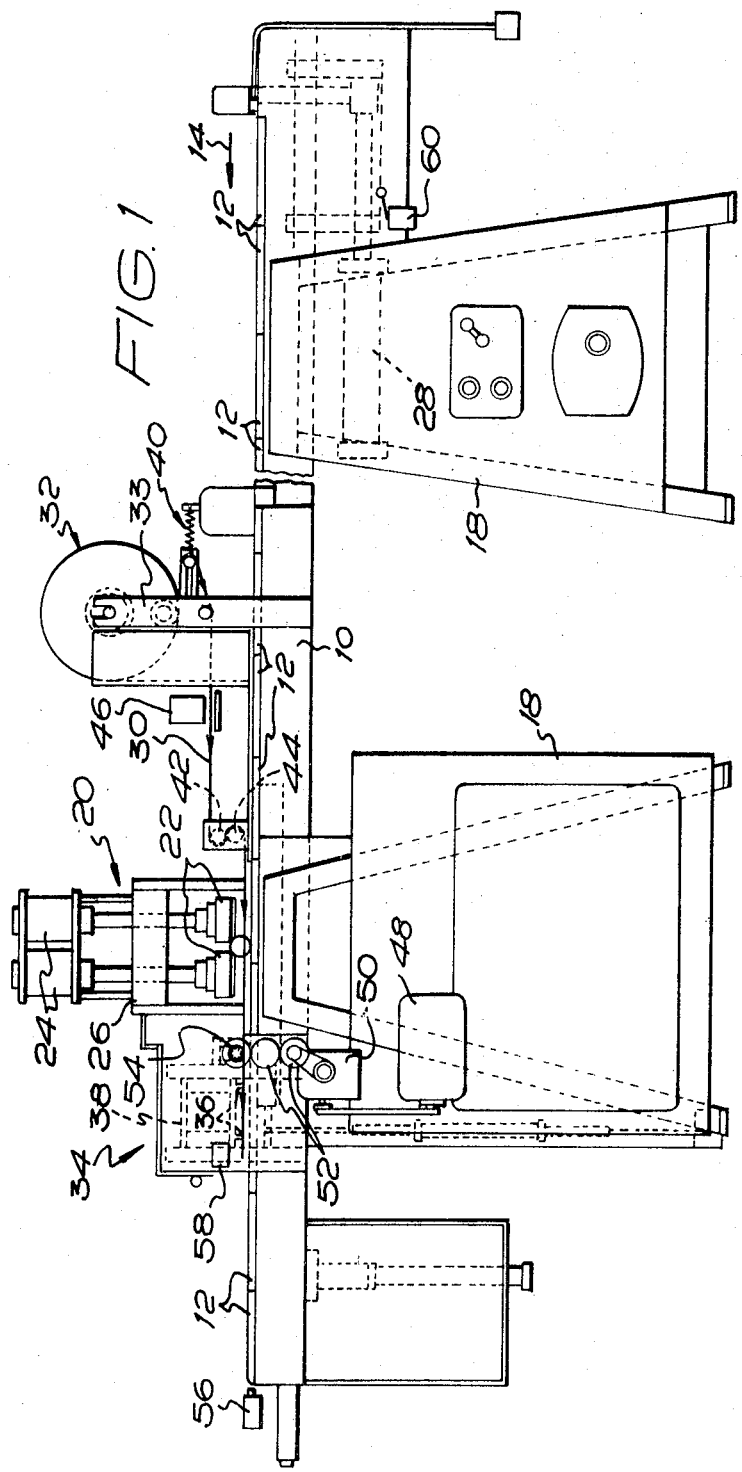
FIG. 1 is a side view of apparatus according to the embodiment of the invention.
Figure 2:
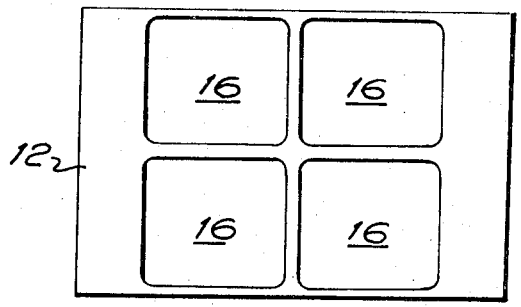
FIG. 2 is a plan view of one of the platens shown in FIG. 1.

Referring now to FIG. 1, the apparatus has a horizontal table 10 along which a plurality of side-by-side similar platens 12 move in the direction of arrow 14 during operation of the apparatus. The platens 12 are accurately machined and in this example are adapted each to carry four thin walled thermoplastics material trays or containers 1. A single platen 12 is shown in FIG. 2 and will be seen to be a rectangular plate having four equal through apertures 16 disposed in a square array and each adapted to accommodate a container 1 of similar configuration. In FIG. 3 there are shown three platens 12 disposed side-by-side in the positions which they take up as they pass along table 10. The direction of movement of the platens 12 along the table 10 is again indicated by arrow 14.

The table 10 is supported on two support frames 18 such that the table overhangs at each end thereof. The apparatus also has a return path for the platens 12. Thus, the platens 12 are removed, with filled sealed containers therein from the end of the table 10 transversely thereof onto the return table, on which the platens move in the opposite direction to that illustrated in FIG. 1. During their course of movement on the return table, the platens are emptied, of the sealed containers and have inserted therein before they are transferred back to the input end of table 10, containers which may be prefilled or filled at a later stage but before they reach the sealing head 20 of the apparatus. Thus, the platens 12 are continuously circulated during operation of the apparatus.

The sealing head 20 comprises die means in the form of four dies 22 which are disposed in the same array as the apertures 16 and are constructed to seal the lidding material only to the flanges 2 of the containers in the platens 12. Each die has its own operating device, in this case a pneumatic ram 24 which is carried on a support structure 26. By providing a pneumatic ram 24 for each die 22, it is ensured that there is effective sealing of all containers in the platen 12 even if one die is sealing through thicker material than the other three. The dies 24 are operated by a source of pressure air which is fed thereto at the appropriate instant in the cycle of operations. The dies are heated to the requisite temperature for heat sealing and are provided with thermostatically controlled heaters for the purpose. The die surfaces may be treated with release agents such as TEFLON or FLUON or there may be a band of barrier material between the die faces and the lidding material to prevent the dies 24 from adhering to the lidding material. However, when polystyrene lidding material is being adhered to polystyrene containers, release agents or barrier material need not be used.

The platens 12 are advanced along the table 12 intermittently with dwell periods in between, during which the dies 24 seal the containers under the dies at those times. The drive means for the platens is a pneumatic feed ram 28 which abuts the end platen 12 and pushed all the platens 12 on the table 10 by the dimension of one platen 12 in the direction of the length of table 10. Ram 28 is supported on one of frames 18.

As the platens 12 are so indexed forwards, the appropriate length of lidding material 30, in this case, polystyrene, is unrolled from a reel 32 of such material and pulled under the dies 24, the reason for this being that the lidding material 30 remains sealed to the containers in each platen 12 as it is pushed out from under the dies 24. Subsequently the lidding material is severed at a severing station, to detach the containers in each platen 12 one from the other.

The severing station, indicated by 34, which is downstream of the sealing head has transverse severing means in the form of knives or cutter bars 36 spaced apart by an amount equal to the width of a container in the direction of the length of table 10, which bars 36 are reciprocable (and heated if desired) transversely of the table 10 during dwell periods by means of a pneumatic ram (not shown) which reciprocates a cradle 38 at the severing station. There is also a longitudinal cutter knife for slitting the lidding material and so separating the individual containers longitudinally of the table. The platens 12 preferably each have a rubber coating or cover on the top thereof to prevent same from being scored or scratched. The cover or coating also acts as a heat insulator to prevent heat loss from the dies to the platens. The cutters simply penetrate slightly into the rubber cover or coating.

The reel 32 of lidding material is rotatably carried in support means in the form of upstanding trunnion arms 33 so that the material 30 can unroll as the apparatus operates. The lidding material 30, in passing from the reel 32 to a position under the dies 24, passes round a tensioning device 40 which is simply a spring biassed roller, and round a pair of guide rollers 42, 44 to bring the lidding material 30 into close proximity and as near parallel disposition as possible to the top of the platens 12.

In most cases the lidded material will carry a printed, repeating pattern, so that each sealed container 1 carries that pattern. In such cases, it is important that the printed matter on the lidding material 30 should be in exact register with the platen under the dies 24 before sealing of the containers 1. To achieve this the apparatus is provided with compensating means.

It is to be mentioned that this compensating means works on the principle that any errors in printing must be over-pitching errors. This is, the patterns must be spaced apart on material 30 more than the required amount. The compensating means in this case is a sensing photoelectric cell device 46 and a brake motor 48 whose operation is controlled by the device 46. The brake motor 48, which is accurately controlled by the device 46, drives through a reduction gearbox 50 and a geartrain 52, knurled rollers 54 which frictionally engage on the edges not covered by lidding material 30 of the platens 12 between the sealing head 20 and the severing station.

If the device 46 senses that the lidding material, as regards the printed pattern, is displaced rearwardly of the platen 12 under the die, then the motor 48 rotates the knurled rollers 54 which action moves the platen 12 engaged thereby and any platen 12 downstream thereof in the direction of arrow 14 whilst the platen 12 under the dies 24 remains stationary. As the platens 12 having containers to which the lidding material 30 is sealed are moved forwards, so the lidding material is advanced until the sensing device 46 senses that the lidding material 30 is in the correct position and stops motor 48 so that sealing can take place. When the platens 12 are indexed by the ram 28, the end platen 12 meets a stop placing all the platens 12 on table 10 in the correct register in relation to the dies 24. When the forward platens are advanced however during a compensating movement as above described, the said stop yields resiliently.

The platens 12 are accurately machined from steel to within one thousandth of an inch so that they butt squarely and accurately together and so that the flanges of adjacent containers in the same and adjacent platens, when the platens carry a queue of containers passing the sealing head 20, are almost touching one another whereby the minimum of, or no lidding material 30 is wasted. Also to this end, the breadth of the lidding material 30 is exactly equal to the width of the queue of containers.

The apparatus may be made automatic or semiautomatic and shown at 56, 58 and 60 are micro switches which are operated respectively by the end platen 12 on table 10 at the output end thereof, the traversing ram (or a part moved thereby) of the severing station, and the feed ram 28, so that signals are derived which can be used to sequence the operation of the apparatus.

Instead of the pneumatic system described for the dies 24, feed of the platens and operation of the cutters, a hydraulic, mechanical or electrical system may be employed.

The sealed containers may be lifted out of the platens also by pneumatic means, when on the return table of the apparatus. The sealed containers may be lifted into a vertical support in which they are held and are removed from the top thereof.

The platens 12 may be supported on chains so that they could be carried on the lower reaches of such chains in being passed back to the inlet end of the apparatus. In this case, however, the connection between the chains and platens would have to be such as to allow the platens to have a slight movement relative to the chains to allow for compensation of printing errors.

Also, the platens 12 instead of being moved transversely off and onto table 10, could be lowered at the output end, moved under the table 10 back to the input end and again raised to the table 10.

We claim:

1. Apparatus for sealing thin walled containers each having a top peripheral flange, said apparatus comprising a plurality of side by side platens adapted to support a queue of said containers, a sealing head, support means for a roll of lidding material, means for moving the head and a queue of containers carried by the platens relative to one another in a linear direction of travel of said queue, storage means for the lidding material including a roll of said lidding material on the support means, said lidding material being sealed to the flanges of the queue of containers by the sealing head, severing means for severing the lidding material extending between adjacent containers, said sealing head and support means for the lidding material being stationary, and drive means for moving the platens past the sealing head, the arrangement being that the lidding material is unrolled by the movement of the platens after it has been sealed to the leading containers in such platen, said sealing head including reciprocable die means and wherein said drive means is intermittent and provides dwell times between movements of the platens so that the lidding material is heat sealed to the containers during such dwell times, and wherein said die means comprises several dies each of which is adapted to seal one container, said dies being connected for simultaneous operation but being capable of independent operation.

2. Apparatus according to claim 1, wherein said support means, sealing head and severing means are located in the named order in the direction of movement of the platens, the containers which are sealed with lidding material and moved from under the sealing head carrying the lidding material therewith to unroll such material before reaching the severing means.

3. Apparatus according to claim 2, wherein the platens are each adapted to carry four containers in a square array, and are machined to within one thousandth of an inch so that the flanges of adjacent containers therein and in adjacent platens will be almost touching, ensuring that there is a minimum wastage of the lidding material.

4. Apparatus according to claim 3, wherein each platen has a coating or covering of resilient heat insulating material which also serves to prevent scoring of the platen by the severing means.

5. Apparatus according to claim 3, wherein the platens have through apertures in which the containers sit so that such containers can be removed from the platens by means over which the platens pass and which can be pushed up through the apertures in such platens.

6. Apparatus according to claim 3, wherein the severing means comprises reciprocable cutter means for severing the lidding material transversely of the queue of containers and a longitudinal knife means for slitting the lidding material longitudinally of the queue.

7. Apparatus for sealing thin walled containers each having a top peripheral flange, said apparatus comprising a plurality of side by side platens adapted to support a queue of said containers, a sealing head, support means for a roll of lidding material, means for moving the head and a queue of containers carried by the platens relative to one another in a linear direction of travel of said queue, storage means for the lidding material including a roll of said lidding material on the support means, said lidding material being sealed to the flanges of the queue of containers by the sealing head, severing means for severing the lidding material extending between adjacent containers, photoelectric sensing means for detecting the position of over pitched printed matter on the lidding material, adjusting means comprising a friction wheel engaging a platen downstream of the sealing head but upstream of the severing means and a brake motor which is drivingly connected to the friction wheel and is under control of the photoelectric sensing means to move platens downstream of the sealing head and lidding material sealed to containers therein away from the platen under the sealing head, whereby the lidding material is moved relative to the platen under the sealing head until the over pitched printing is brought into register with the platen under the sealing head.

* * * * *